United States Patent
Cole

(10) Patent No.: US 7,916,395 B2
(45) Date of Patent: Mar. 29, 2011

(54) CAVITY RING-DOWN SPECTROSCOPY MIRROR, AND METHODS OF USING SAME

(75) Inventor: Barrett E. Cole, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 12/037,815

(22) Filed: Feb. 26, 2008

(65) Prior Publication Data
US 2009/0213463 A1 Aug. 27, 2009

(51) Int. Cl.
*G02B 1/10* (2006.01)

(52) U.S. Cl. ............. 359/584; 356/436

(58) Field of Classification Search .......... 359/260, 359/584, 586–589; 356/436, 437
See application file for complete search history.

(56) References Cited

U.S. PATENT DOCUMENTS

| 5,926,317 | A  * | 7/1999  | Cushing ............... 359/588 |
| 6,631,033 | B1 * | 10/2003 | Lewis ................ 359/584 |
| 7,116,423 | B2   | 10/2006 | Paldus et al. |
| 7,145,165 | B2   | 12/2006 | Cox et al. |

* cited by examiner

*Primary Examiner* — Alessandro Amari
(74) *Attorney, Agent, or Firm* — Schwegman, Lundberg & Woessner, P.A.

(57) ABSTRACT

A cavity ring-down spectroscopy (CRDS) mirror is constructed to resist migration of a maximum reflectance peak during use where the CRDS mirror may become accreted with contamination that would otherwise cause the maximum reflectance peak to migrate. The mirror includes a mirror stack disposed on a mirror substrate and a plurality of alternating laminates including a first film with a first index of refraction and a second film with a second index of refraction. Each film is a one-quarter wavelength thickness of a given light energy that is to illuminate the mirror. A subsequent laminate is disposed on the plurality of alternating laminates. The subsequent laminate includes a quarter wavelength thickness first film and a second film with a wavelength thickness in a range from greater than 1.5 quarter wavelength and less than 2 quarter wavelength.

8 Claims, 6 Drawing Sheets

Design - (Si / SiO2)^7 Si / 2Q ZrO2 / Absorber designed for 1600 nm

Design - (Si / SiO2)^7 Si / 2Q ZrO2 / 100 nm n=2 k=.0001 Absorber

Design - (Si / SiO2)^7 Si / 1.8Q ZrO2 / No Absorber

Design - (Si / SiO2)^7 Si / 1.8Q ZrO2 / 100 nm n=2 k=.0001

CAVITY RING-DOWN SPECTROSCOPY MIRROR, AND METHODS OF USING SAME

BACKGROUND

Cavity ring-down spectroscopy (CRDS) can be used to measure the concentration of some light-absorbing fluid substance. The cavity refers to the space between mirrors that exchange light. A brief pulse of laser light is injected into the cavity, and it bounces back and forth between the mirrors. Some small amount (typically around 0.1% or less) of the laser light leaks out of the cavity and can be measured each time light hits one of the mirrors. Since some light is lost on each reflection, the amount of light hitting the mirror is slightly less each time. Since a percentage leaks through, the amount of light measured also decreases with each reflection.

If something that absorbs light is placed in the cavity, the light will undergo fewer reflections before it is dissipated. CRDS measures how long it takes for the light to drop to a certain percentage of its original amount, and this ring-down time is converted to a concentration of the fluid being analyzed.

Cavity ring-down spectroscopy is a form of laser absorption spectroscopy and is also known as cavity ring-down laser absorption spectroscopy (CRLAS). In CRDS, a laser pulse is trapped in a highly reflective (typically R>99.9%) detection cavity. The intensity of the trapped pulse will decrease by a fixed percentage during each round trip within the cell due to both absorption by the medium within the cell and reflectivity losses. The intensity of light within the cavity is then determined as an exponential function of time.

$$I(t) = I_0 \exp(-t/\tau) \qquad (1)$$

The principle of operation is based on the measurement of a decay rate rather than an absolute absorbance. This is one reason for the increased sensitivity over traditional absorption spectroscopy. The decay constant, $\tau$, is called the ring-down time and is dependent on the loss mechanism(s) within the cavity. For an empty cavity, the decay constant is dependent on mirror loss and various optical phenomena like scattering and refraction:

$$\tau_0 = \frac{n}{c} \cdot \frac{l}{1-R+X} \qquad (2)$$

where n is the index of refraction within the cavity, c is the speed of light in vacuum, l is the cavity length, R is the mirror reflectivity, and X is the miscellaneous optical losses. Often, the miscellaneous losses are factored into an effective mirror loss for simplicity. An absorbing species in the cavity will increase losses according to the Beer-Lambert law. Assuming the sample fills the entire cavity, $$\tau = \frac{n}{c} \cdot \frac{l}{1-R+X+\alpha l} \qquad (3)$$

where $\alpha$ is the absorption coefficient for a specific analyte concentration. The absorbance, A, due to the analyte can be determined from both ring-down times.

$$A = \frac{n}{c} \cdot \frac{l}{2.303} \cdot \left(\frac{1}{\tau} - \frac{1}{\tau_0}\right) \qquad (4)$$

Alternately, the molar absorptivity, $\in$, and analyte concentration, C, can be determined from the ratio of both ring-down times.

$$\frac{\tau}{\tau_0} = \frac{\alpha l}{1-R} = \frac{\in lC}{2.303(1-R)} \qquad (5)$$

BRIEF DESCRIPTION OF THE FIGURES

Embodiments of this disclosure are illustrated by way of example and not limitation in the Figures of the accompanying drawings in which.

DETAILED DESCRIPTION

Figure 1:
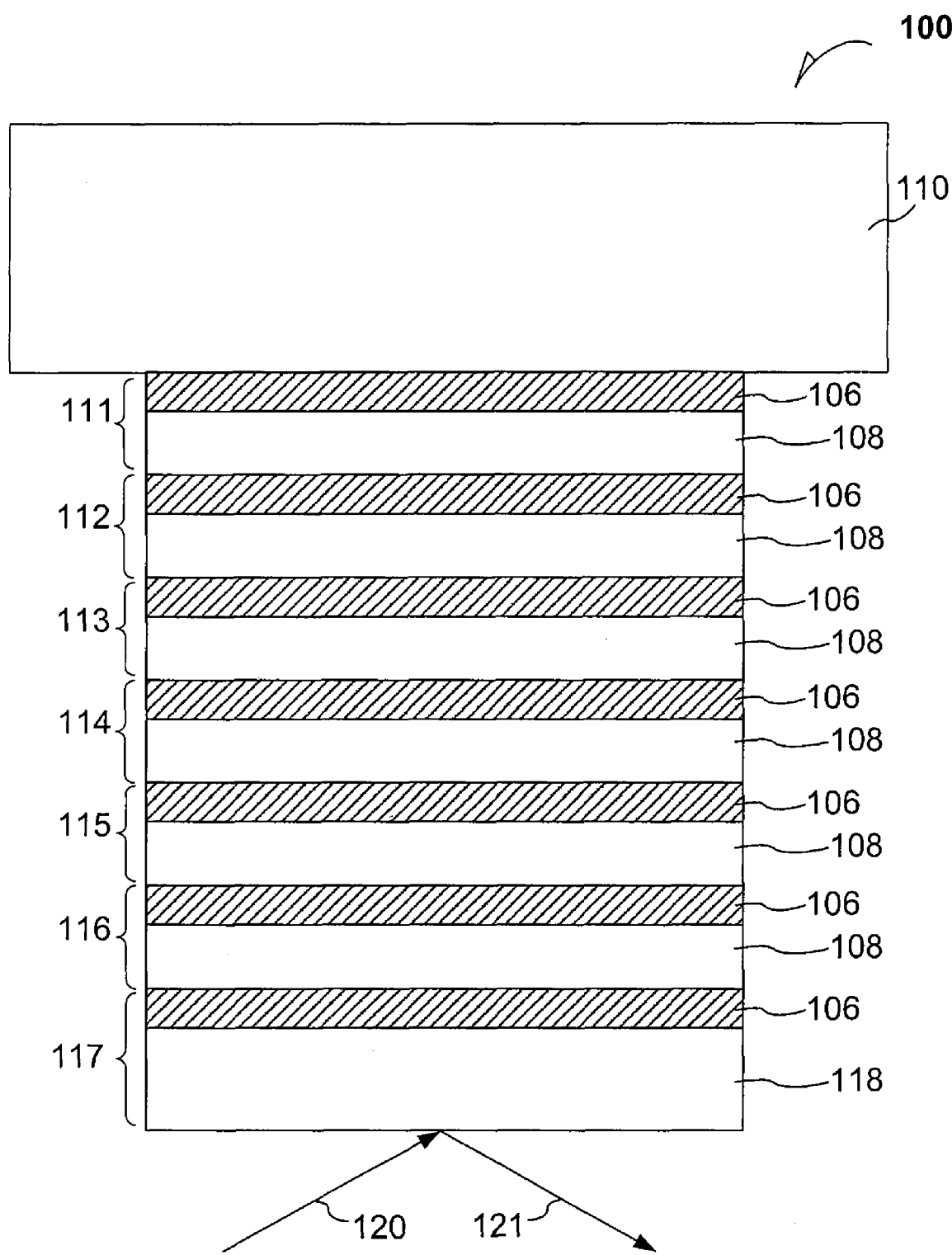
FIG. 1 is a cross sectional elevation of a cavity ring-down spectroscopy mirror in an example embodiment.

In the following description, numerous specific details are set forth. The following description and the drawing figures illustrate aspects and embodiments sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions may be optional, and the sequence of operations may vary or run in parallel. Portions and features of some embodiments may be included in, substituted for or added to those of others. The scope of the embodied subject matter encompasses the full ambit of the claims and substantially all available equivalents.

FIG. 1 is a schematic elevation of a high-reflectance mirror system 100 in an example embodiment. In an embodiment, the high-reflectance mirror system 100 is part of a cavity ring-down spectrum (CRDS) analytical apparatus. A mirror substrate 110 is provided to support a mirror stack. The mirror stack may also be referred to as a mirror laminate. In an embodiment, the mirror substrate 110 is manufactured of a dielectric material such as an oxide of a refractory metal. Examples include thoria, hafnia and zirconia. In an embodiment, the mirror substrate 110 is made of silica glass. In an embodiment, the mirror substrate 110 is made of calcium fluoride (CaF).

The high-reflectance mirror system 100 embodiment includes high reflectance mirror lamina that includes alternating high and low indexes of refraction materials. As depicted in FIG. 1, a first laminate 111 includes a silicon first film 106 and a silica (silicon dioxide) second film 108. The first laminate 111 is constructed with the silicon first film 106 and the silica second film 108, each with a quarter wave (Q) thickness at the wavelength that will be used for the CRDS mirror. In an embodiment, the CRDS mirror uses the silicon- and silicon dioxide. Silicon and silicon dioxide are useful materials as they have comparatively high and very low refractive indexes such that higher reflectance is achieved with few laminate layers. In addition, the use of both a high and low index material with a large difference greatly expands the range over which the cavity has high reflectance and makes it possible for the cavity to support resonances over a wider range of input wavelengths from tunable lasers.

The high-reflectance mirror system 100 embodiment also includes a second laminate 112, a third laminate 113, a fourth laminate 114, a fifth laminate 115, and a sixth laminate 116. Each laminate includes alternating high- and low index materials, and in this embodiment, these materials are respectively a silicon first film 106 and a silica second film 108. Additionally, a subsequent (and in this instance, a seventh) laminate 117 is added. This subsequent laminate 117 provides another material without effectively changing the reflectance properties. In an embodiment, this subsequent laminate 117 contains a material that is not known for a high or low index but is used for resistance to chemical etching that may occur in harsh environments where the high-reflectance mirror system 100 may be put to use. The high-reflectance mirror system 100 as described, may be referred to as (Si/SiO2)^6 Si/nZrO2. The ^6 represents the structure in parentheses is repeated six times.

The Si/nZrO2 represents a silicon layer and an n-multiple of a quarter wave of zirconia. In an embodiment, the high-reflectance mirror system 100 as described may be referred to as (Si/SiO2)^6 Si/1.8ZrO2, wherein the zirconia layer is 1.8 quarter wavelengths thick. In an embodiment, the high-reflectance mirror system 100 as described may be referred to as (Si/SiO2)^6 Si/2ZrO2 wherein the zirconia layer is two quarter wavelengths thick.

In an embodiment, the seventh laminate 117 adds a half-wave first film 106, and a greater-than-half-wave second film 118. This second film 118 may also be referred to as a near half-wave film 118. In an embodiment, the second film 118 of the high-reflectance mirror system 100 is prepared for operation in environments where the front surface of the mirror is expected to get contaminated. As a material with a refractive index and non-zero absorption is added to the front surface, the absorption of the light increases around the central wavelength. By making the front mirror less than a full wave, the high reflectance properties of the mirror are maintained through a wide range of contamination of the mirror front surface.

During use of the high-reflectance mirror system 100, contamination may build onto the mirror, the reflectance peak narrows and the wavelength shifts. To keep the reflectance as constant as possible, an embodiment corrects for contamination. This correction does not degrade the reflectance when the mirror is pristine. Further, this correction maintains that the reflectance will be near the maximum as the effect of slight contamination is tolerated.

In an embodiment, the high-reflectance mirror system 100 is designed with the n and k of the material taken into consideration that is being absorbed on the surface of the mirror. The term n refers to the index of refraction of the material and the term k refers to the dielectric constant of the material.

Figure 2:
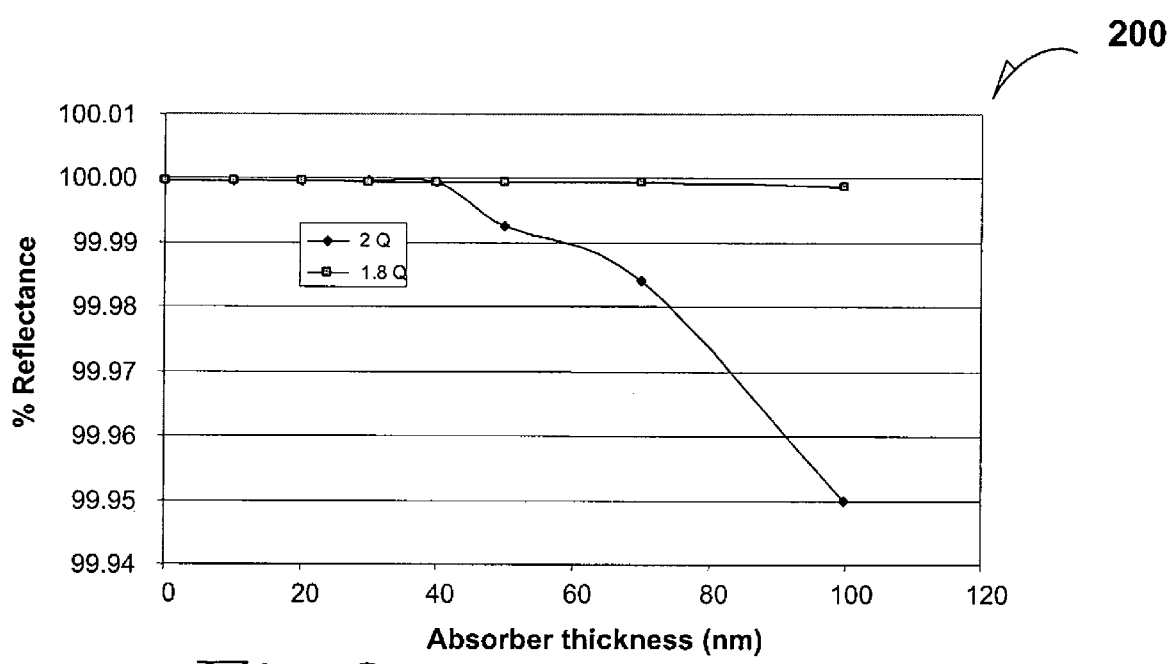
FIG. 2 illustrates the effect when the thickness of an absorbed film is accreted to the front surface of a cavity ring-down spectrum mirror in an example embodiment.

FIG. 2 illustrates the effect when the thickness of an absorbed film is added to the front surface of a CRDS mirror. Table 1 (below) reports data points that are found in the table 200 in FIG. 2. In an embodiment, the front half wave film is made a little thinner than two quarter waves, such as 1.8 quarter waves. The effect of contamination on the reflectance is significantly reduced at no expense to maximum reflectance.

TABLE 1

Reflectance Dependency on Quarter-Wave Thickness

| t, nm | 2Q | 1.8Q |
|---|---|---|
| 0 | 99.99970 | 99.9997 |
| 10 | 99.99970 | 99.9996 |
| 20 | 99.99967 | 99.9995 |
| 30 | 99.99959 | 99.9995 |
| 40 | 99.99946 | 99.9995 |
| 50 | 99.99250 | 99.9995 |
| 70 | 99.98400 | 99.9994 |
| 100 | 99.50000 | 99.9987 |

Figure 3:
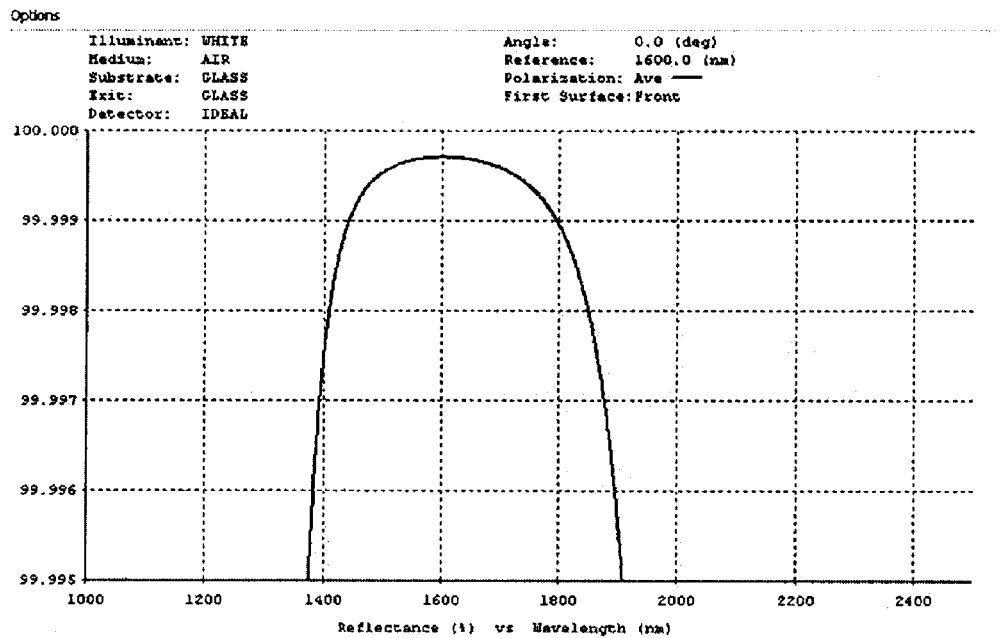
FIG. 3 is a graphic study of a high-reflectance mirror system in an example embodiment.

FIG. 3 is a graphic study of a high-reflectance mirror system in an example embodiment. A seven-lamina Si/SiO2 structure, with a two-quarter wave thickness zirconia (ZrO2) film on a silica film was tested for maximum reflectance. Reflectance versus wavelength illustrates a peak near about 1600 nano meters (nm).

Figure 4:
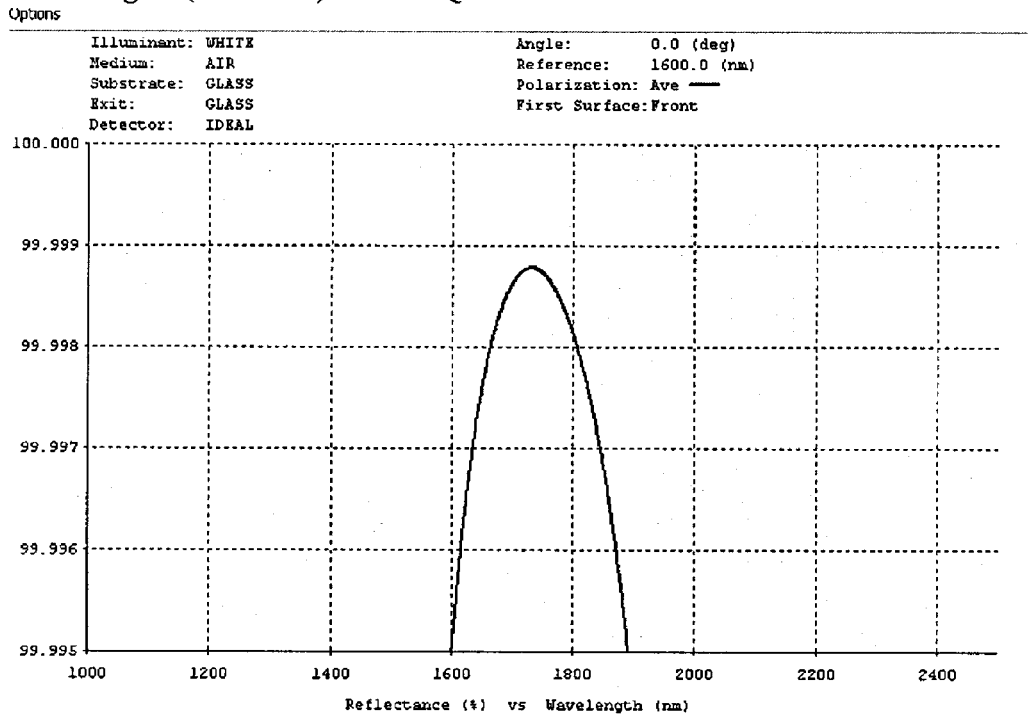
FIG. 4 is a graphic study of a high-reflectance mirror system in an example embodiment.

FIG. 4 is a graphic study of a high-reflectance mirror system in an example embodiment. The seven-lamina Si/SiO2 structure, with a two-quarter wave thickness zirconia (ZrO2) film on a silica film as depicted in FIG. 3, was tested for maximum reflectance. A 100 nm absorbed contaminant on the zirconia film resulted in a sharpened and slightly lowered reflectance-versus-wavelength peak that is near about 1700 nm.

Figure 5:
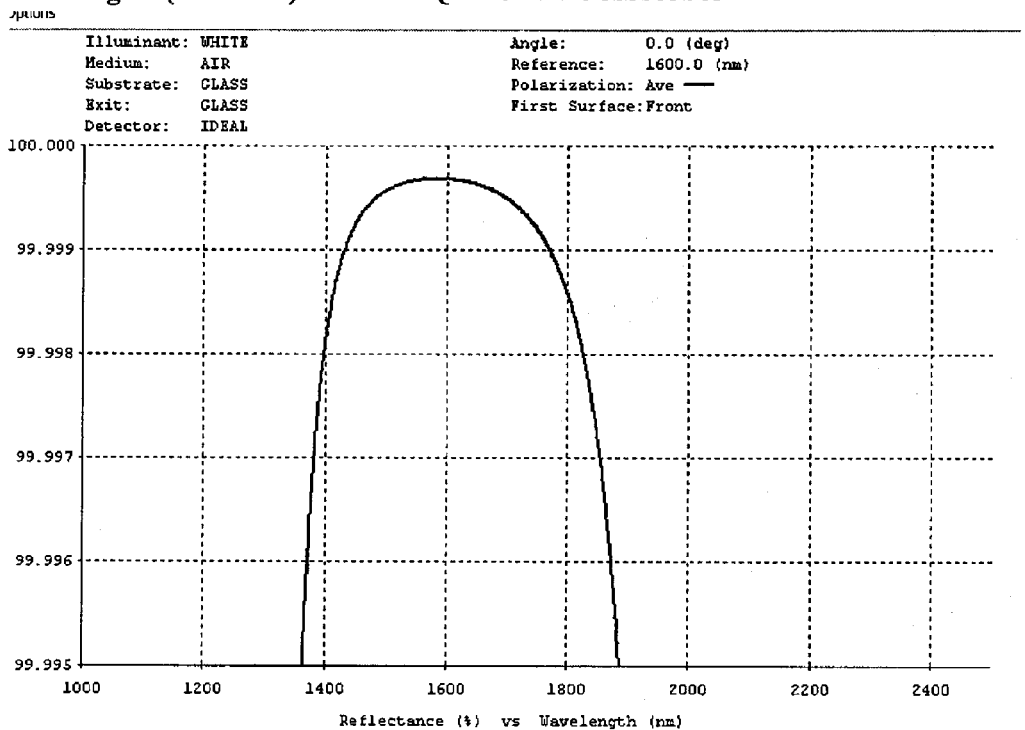
FIG. 5 is a graphic study of a high-reflectance mirror system in an example embodiment.

FIG. 5 is a graphic study of a high-reflectance mirror system in an example embodiment. A seven-lamina Si/SiO2 structure, with a 1.8-quarter wave thickness zirconia (ZrO2) film on a silica film was tested for maximum reflectance. Reflectance versus wavelength illustrates a peak near about 1600 nm that is very similar to the reflectance-versus-wavelength peak depicted in FIG. 3.

Figure 6:
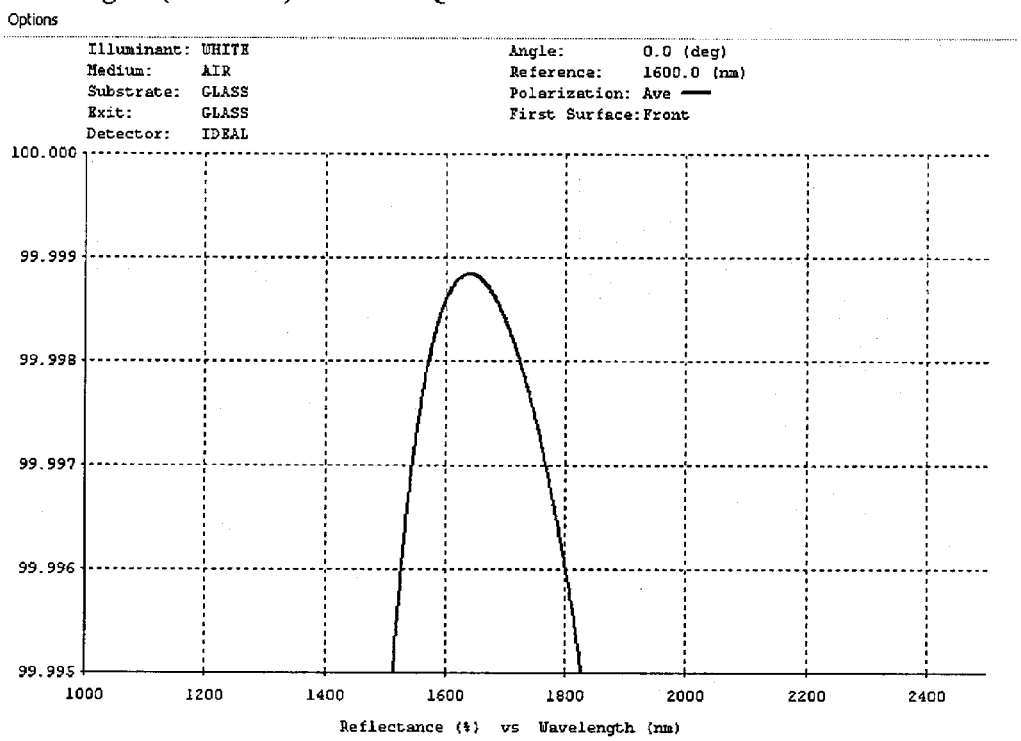
FIG. 6 is a graphic study of a high-reflectance mirror system in an example embodiment.

FIG. 6 is a graphic study of a high-reflectance mirror system in an example embodiment. The seven-lamina Si/SiO2 structure, with the 1.8-quarter wave thickness zirconia (ZrO2) film on a silica film as depicted in FIG. 5, was tested for maximum reflectance. A 100 nm absorbed contaminant on the zirconia film resulted in a sharpened but not significantly changed peak with respect to wavelength. The slightly lowered reflectance-versus-wavelength peak remains near about the 1600 nm that was exhibited in the graphic study of FIG. 5. Consequently, a high-reflectance mirror system that uses the structure used for the FIG. 6 graphic study results in a marginalized detrimental effect of adsorbed contamination upon reflectance.

In an embodiment, a high-reflectance mirror system uses a $(Si/SiO_2)^7$ $Si/1.7Q$ $ZrO_2$ structure. In an embodiment, a high-reflectance mirror system uses a $(Si/SiO_2)^7$ $Si/1.9Q$ $ZrO_2$ structure. In an embodiment, a high-reflectance mirror system uses a $(Si/SiO_2)^7$ $Si/nQ$ $ZrO_2$ structure where n is greater than 1.5 and less than 2.

Reference is again made to FIG. 1. In an embodiment, the high-reflectance mirror lamina include alternating high and low indexes of refraction materials (silicon dioxide) second film 108. The first laminate 111 is constructed with the silicon first film 106 and the silica second film 108, each with a quarter wave thickness at the wavelength that will be used for the CRDS mirror. In an embodiment, the CRDS mirror uses the silicon- and silicon dioxide, which are useful materials as they have both a comparatively high and very low refractive indexes such that higher reflectance is achieved with few layers. Other high- and low refractive index materials may be used. In an embodiment, the high-reflectance mirror system 100 embodiment also includes several additional laminates such as the second laminate 112, the third laminate 113, the fourth laminate 114, the fifth laminate 115, and the sixth laminate 116. Each laminate includes alternating high- and low index materials. Additionally, the seventh laminate 117 is added. In an embodiment the seventh laminate 117 is made of the same materials of the previous laminates, but the greater-than-half-wave second film 118 has a quarter-wave thickness in a range from greater than 1.5 Q and less than 2 Q. By making the front mirror less than a full wave, the high reflectance properties of the mirror are maintained through a wide range of contamination of the mirror front surface.

Figure 7:
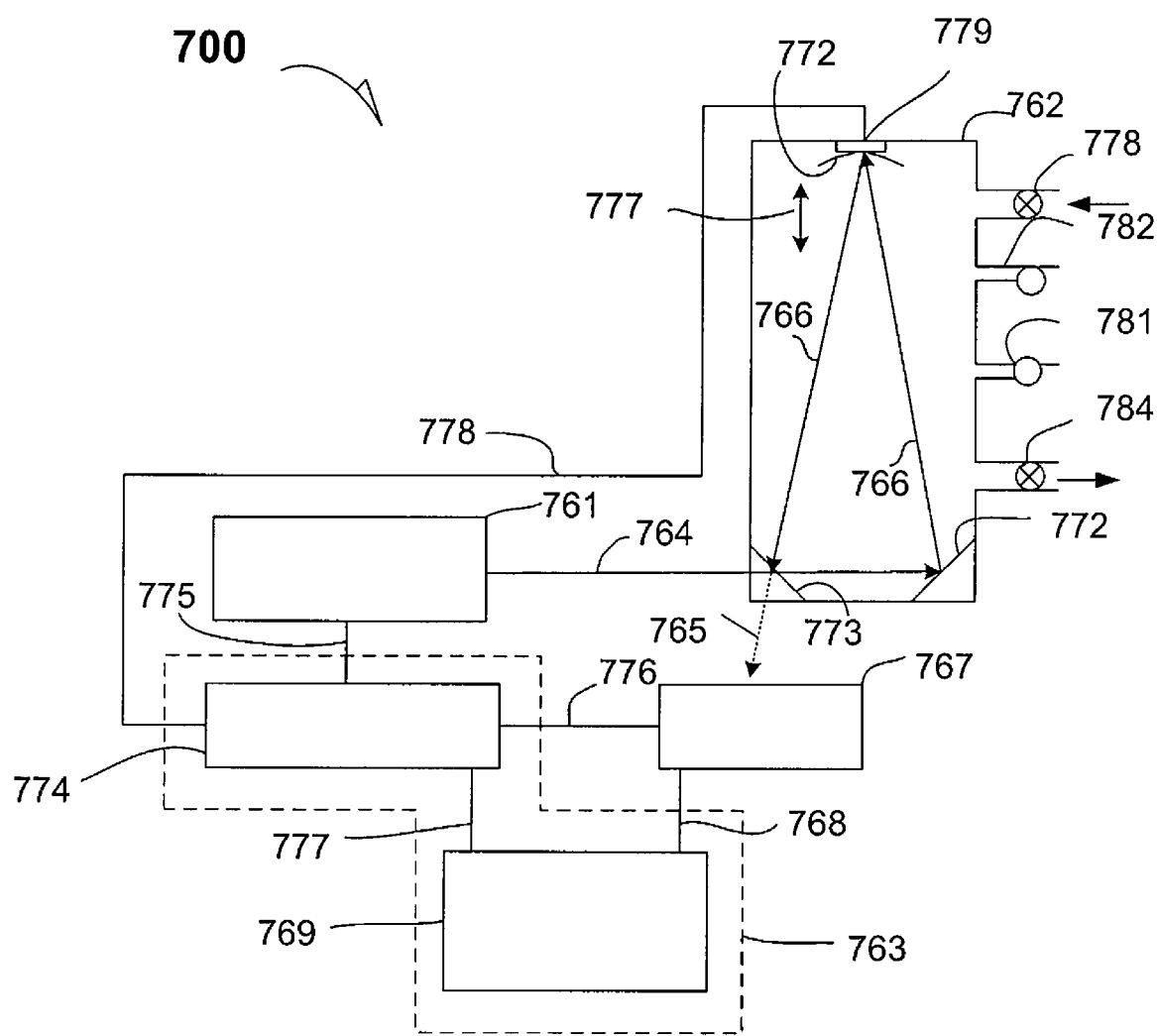
FIG. 7 is a schematic of a cavity ring-down spectrum mirror apparatus in an example embodiment.

FIG. 7 is a schematic of a cavity ring-down spectrum (CRDS) mirror apparatus 700 in an example embodiment. As shown in FIG. 7, a laser 761 may be coupled to a three mirror optical ring-down cavity 762. One of the mirrors, e.g., mirror 772, may have a slight curvature to improve focusing stability of the light beam This helps the light beam 766 to remain reflecting from mirror-to-mirror, etc. within the cavity 762, as opposed to missing a mirror after several reflections.

The cavity 762 may be a ring laser cavity or a ring laser gyroscope cavity, though not functionally used as a gyro. The cavity 762 instead may have two mirrors, four mirrors, or any other number of mirrors providing a light path selected from various possible routes for light in the cavity 762. In an embodiment, there is an analog detection circuit 763 to extract the ring-down rate from an exponentially decaying ring-down waveform.

A technique may be used to measure trace concentrations of gases in the near infrared region using a continuous wave excitation of incoming light 764 of a cavity ring-down spectroscopy cell or cavity 762. Cavity ring-down spectroscopy may be an absorption technique in which incoming light 764 is coupled into a high finesse optical resonator. The cavity 762 may be tuned to the absorption line of the gas in the cavity being sensed and quantitatively measured. The cavity 762 may be tuned such that light beam 766 is in phase with the incoming light 764. This tuning, such as adjusting the path length of the light beam 766, may be applicable to other kinds of cavities, such as those with two mirrors, four mirrors, and the like. Tuning the cavity 762 with adjusting the mirrors may be one way of adjustment. Similarly, a light source 761 may have an output wavelength tuned to the absorption line of the gas in the cavity 762. By monitoring the decay rate of the light beam 766 inside the cavity 762 with analog detection circuit 763, which includes a detector 767, one may determine a concentration of a particular gas in the cavity 762. The near infrared light 765 detected may contain vibrational overtone transitions and forbidden electronic transitions of various atmospheric species of gas. The CRDS mirror apparatus 700 may obey Beer's law and provide a highly accurate concentration determination. The effective path length of the light beam 766 in the cavity 762 may be about a hundred times larger than the physical size of the cavity 762 due to highly reflective dielectric mirrors 771, 772 and 773.

There may be fast trace gas impurity measurements of molecules such as $H_2O$, CO, $NH_3$, HF, HCl, $CH_4$ and $C_2 2H_2$. Such measurements may be made in seconds. Trace moisture concentration may be measured at levels from parts per billion (ppb) to parts per trillion (ppt).

In an embodiment, the laser 761 sends a light signal to the cavity 762. The incoming light 764 may be regarded as a signal 766 that is reflected around in the cavity 762 from mirror 771, to mirror 772, to mirror 773, to mirror 771 and so on until the light beam 766 diminishes. Some light 765 may leave the cavity 762 and impinge the detector 767. The detector 767 may convert the light signal 765 to an electrical signal 768 that goes to a data acquisition and analysis unit 769. Control electronics 774 may send control signals 775, 776 and 777 to the laser 761, the detector 767 and the data acquisition and analysis unit 769, respectively. Also, a control signal 778 may be sent to the moveable support 779 of the mirror 772 to provide tenability of the path for the light beam 766. The support 779 may be a piezoelectric transducer to allow tuning and modulation of the path length of the cavity 762.

One may detect a certain fluid using a laser tuned on a transition band, near a particular frequency. A fluid to be analyzed may be an exhaust bleed from an exhaust corridor of an internal combustion engine. The fluid may enter a port 778 and exit a port 784. The port 781 may be for a connection to a pump and the port 782 may be used for a gauge.

Figure 8:
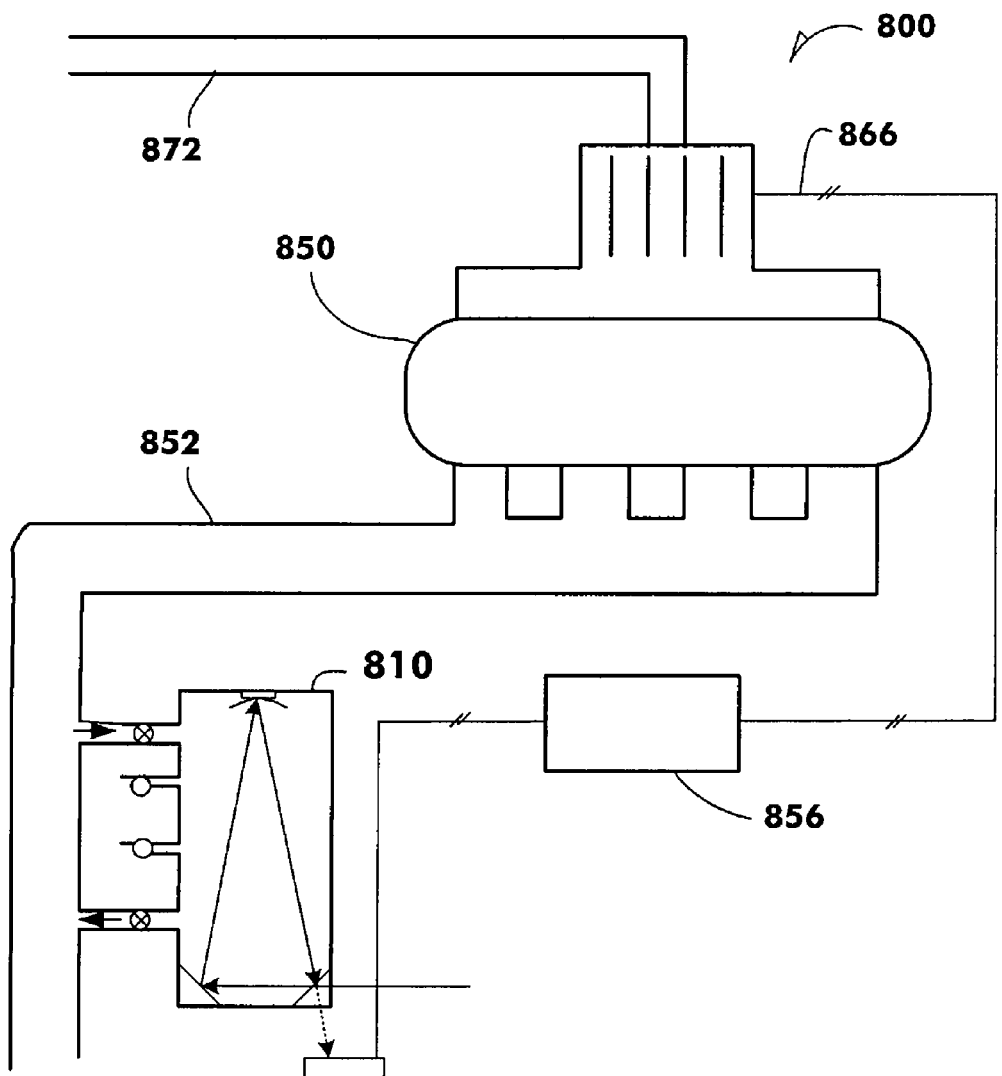
FIG. 8 is an engine system with a cavity ring-down spectroscopy mirror according to an example embodiment.

FIG. 8 is one version of a loop 800 for engine control based on gas stream analysis that uses the passing of a gas stream through a CRDS cavity in an example embodiment. After a gas stream passes through an engine intake 872 and is combined with combustion materials, an engine 850 may output an exhaust 852 which is sensed by a CRDS apparatus 810, which in turn may output a signal 854 to a processor 856.

The output from the processor 856 may include an electronic indication of the qualities in the exhaust gas stream that can be correlated to known peculiarities in a gas stream for process control reasons. This electronic indication may go to an output signal 866 which may be correlated with other various inputs of engine data. Examples of various inputs include timing, temperature, percent exhaust-gas recirculation (EGR), valve position, and others.

It can now be appreciated that several and complex combinations of engine performance can be monitored in part at least by use of a CRDS apparatus embodiment set forth in this disclosure.

Figure 9:
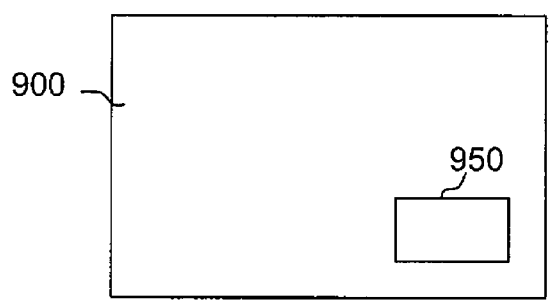
FIG. 9 is a schematic diagram illustrating a medium having an instruction set, according to an example embodiment.

FIG. 9 is a schematic diagram illustrating a medium having an instruction set, according to an example embodiment that uses a CRDS apparatus. A machine-readable medium 900 includes any type of medium such as a link to the Internet or other network, or a disk drive or a solid state memory device, or the like. A machine-readable medium 900 includes instructions within an instruction set 950. The instructions, when executed by a machine such as an information-handling system or a processor, cause the machine to perform operations that include characterization of gas stream embodiments.

In an example embodiment of a machine-readable medium 900 includes a instruction set 950, and the instructions, when executed by a machine, cause the machine to perform operations including gas stream analysis that use a CRDS embodiment. In an embodiment, the machine-readable medium 900 and instruction set 950 are disposed in a module and are locatable within the engine compartment of the internal combustion engine such as a diesel tractor. In an embodiment, the machine-readable medium 900 and instruction set 950 are disposed in a module and are locatable within the cab, such as near the firewall of the engine compartment of an internal combustion engine such as a diesel tractor.

Thus, a system, method, and machine-readable medium including instructions for Input/Output scheduling have been described. Although the various calibration, in situ recalibration, and methods have been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense.

What is claimed is:

1. An apparatus comprising:
a ring-down minor cavity, wherein the ring-down minor cavity includes a plurality of minors, at least one minor of which includes:
a mirror substrate;
a mirror stack disposed on the mirror substrate, wherein the minor stack includes a plurality of alternating laminates including a first film with a first index of refraction and a second film with a second index of refraction, and wherein each of the first film and the second film has a thickness of one quarter wavelength of a given light energy; and
a subsequent laminate disposed on the plurality of alternating laminates, wherein the subsequent laminate includes a quarter wavelength thickness first film and a second film with a wavelength thickness in a range from greater than 1.5 quarter wavelength and less than 2 quarter wavelength.

2. The apparatus of claim 1, wherein the subsequent laminate second film includes a wavelength thickness in a range from 1.7 quarter wavelength and 1.9 quarter wavelength.

3. The apparatus of claim 1, wherein the subsequent laminate second film includes a wavelength thickness of 1.8 quarter wavelength.

4. The apparatus of claim 1, wherein each laminate is a silicon/silica (Si/SiO2) composite, and wherein the subsequent laminate is a silicon/zirconia (Si/1.8QZrO$_2$) composite.

5. The apparatus of claim 1 further including a laser light source, and wherein the plurality of mirrors includes three mirrors, and wherein each minor includes a subsequent laminate second film includes a wavelength thickness of 1.8 quarter wavelength.

6. The apparatus of claim 1, wherein each laminate is a silicon/silica (Si/SiO2) composite, and wherein the subsequent laminate is a silicon/zirconia (Si/1.8QZrO$_2$) composite, the apparatus further including:
a laser light source; and
wherein the plurality of minors includes three minors, and wherein each mirror includes a subsequent laminate second film includes a wavelength thickness of 1.8 quarter wavelength.

7. A method comprising:
operating a cavity ring-down spectroscopy mirror apparatus by transmitting light onto a plurality of mirrors;
observing a first maximum reflectance and a first maximum reflectance peak in terms of wavelength;
allowing accreted material to absorb onto at least one of the plurality of mirrors; and
observing a second maximum reflectance, wherein despite up to 100 nanometer of accreted material on the at least one of the plurality of minors, the maximum reflectance peak migrates less than 500 nanometer in wavelength.

8. The method of claim 7, wherein at least one mirror of the plurality of minors includes:
a ring-down minor cavity, wherein the ring-down minor cavity includes a plurality of minors, at least one minor of which includes:
a mirror substrate;
a mirror stack disposed on the mirror substrate, wherein the minor stack includes a plurality of alternating laminates including a first film with a first index of refraction and a second film with a second index of refraction, and wherein each of the first film and the second film has a thickness of one quarter wavelength of a given light energy; and
a subsequent laminate disposed on the plurality of alternating laminates, wherein the subsequent laminate includes a quarter wavelength thickness first film and a second film with a wavelength thickness in a range from greater than 1.5 quarter wavelength and less than 2 quarter wavelength.

* * * * *